United States Patent [19]

Hayasaka et al.

[11] 4,349,997
[45] Sep. 21, 1982

[54] DEVICE FOR ENABLING REGISTRY OF OPERATIONS IN AN APPARATUS FOR CONTINUOUSLY FORMING CONTAINERS FILLED WITH MATERIAL

[75] Inventors: Yoshiyuki Hayasaka, Tsushima; Ichiro Ikeuchi, Kasugai; Hajime Matsumoto, Sagamihara; Yukihiro Shikaya, Chiba, all of Japan

[73] Assignees: Mitsubishi Jukogyo Kabushiki Kaisha; Dainippon Printing Company Ltd., both of Tokyo, Japan

[21] Appl. No.: 141,888

[22] Filed: Apr. 21, 1980

[51] Int. Cl.³ .................... B65B 41/18; B65B 41/04
[52] U.S. Cl. ............................................ 53/51; 83/72; 83/74; 83/368; 156/351; 156/361; 226/32; 226/41
[58] Field of Search .................. 53/559, 561, 551, 64, 53/51, 72, 75, 389; 226/32, 41; 101/228; 83/72, 368, 74, 75; 156/351, 361

[56] References Cited

U.S. PATENT DOCUMENTS

| | | | |
|---|---|---|---|
| 2,963,965 | 12/1960 | Baumgartner | 83/74 X |
| 3,267,639 | 8/1966 | Ollier et al. | 53/559 X |
| 3,294,301 | 12/1966 | Richter | 53/51 |
| 3,427,778 | 2/1969 | McCluskey | 53/51 X |
| 3,555,768 | 1/1971 | Miller | 53/51 X |
| 4,217,163 | 8/1980 | Utzmann et al. | 226/32 X |

Primary Examiner—Horace M. Culver
Attorney, Agent, or Firm—Wyatt, Gerber, Shoup, Scobey & Badie

[57] ABSTRACT

An apparatus for continuously forming containers, filling the containers with material and packing the containers containing material includes a heating device for heating a bottom sheet of thermoplastic resin supplied intermittently thereto, a forming device for forming container portions from the heated bottom sheet while keeping the latter continuous, a filling device for filling said container portions with material, a sealing device for sealingly covering the container portions with a cover sheet bearing pitch marks corresponding to symbol marks printed thereon, a punching device for removing the sealed containers from the continuous bottom material sheet, and is characterized by that a mark reading device is disposed at a position separated from the sealing device by a distance equal to a distance between the forming device and the sealing device, that a device is associated with at least one of the sealing device and the punching device for forwardly or reversely moving at least one of the sealing device and the punching device in the direction of the bottom sheet supply and that another mark reading device including a pair of mark detectors is provided for reading marks each within one pitch of the cover sheet.

4 Claims, 27 Drawing Figures

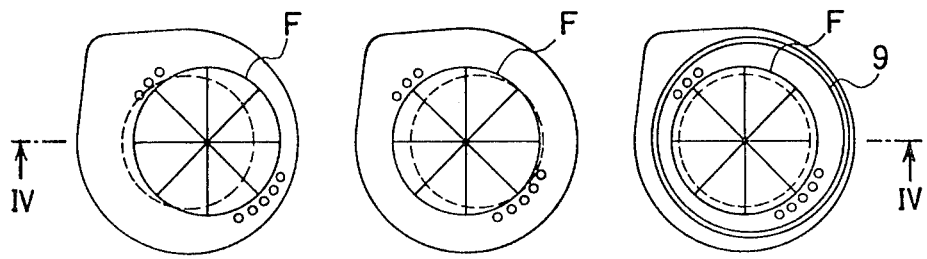
FIG. 4a   FIG. 4b   FIG. 4c
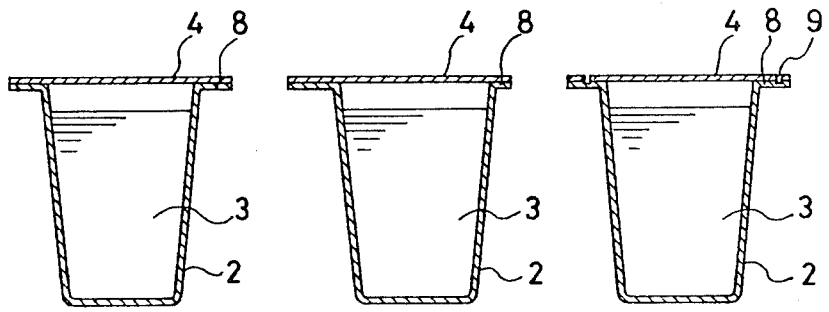
FIG. 5a   FIG. 5b   FIG. 5c
FIG. 6
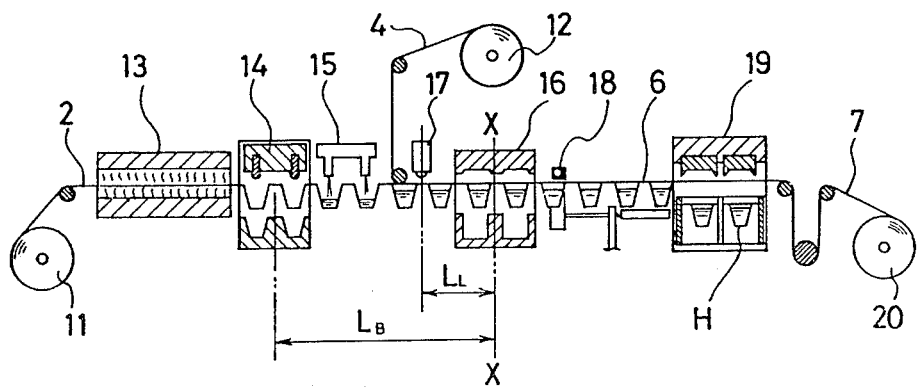

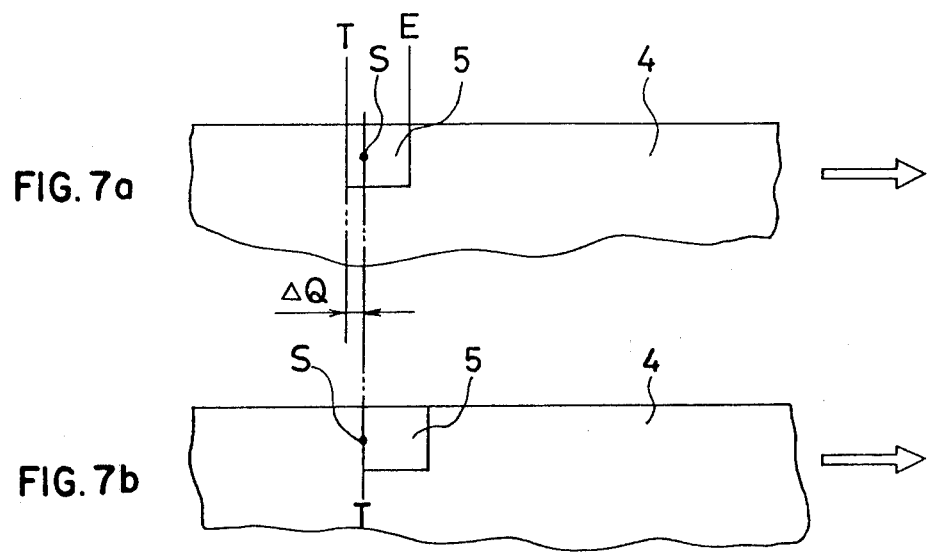
FIG. 7a
FIG. 7b
FIG. 8
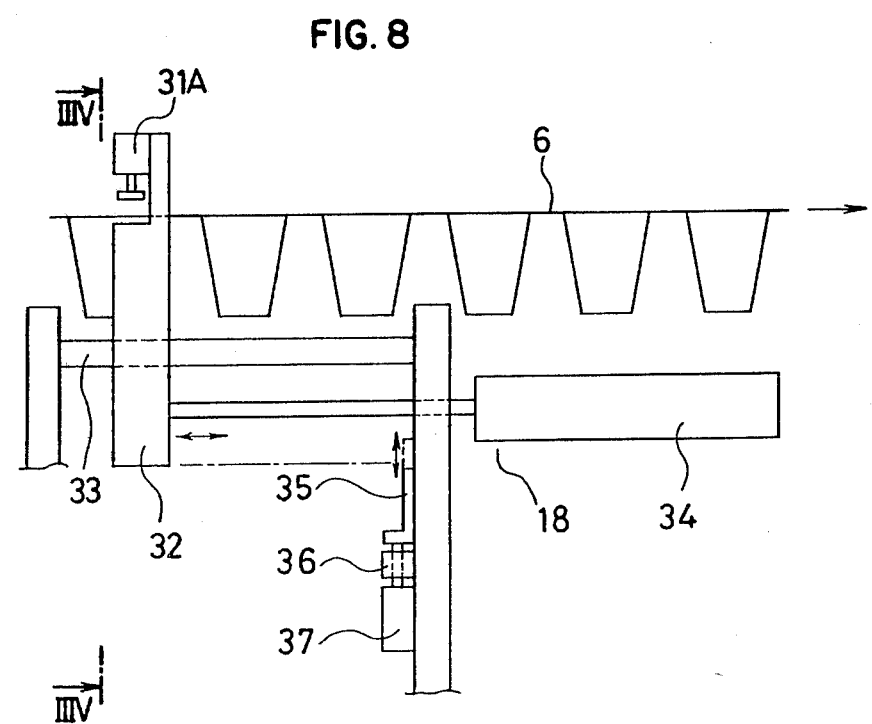

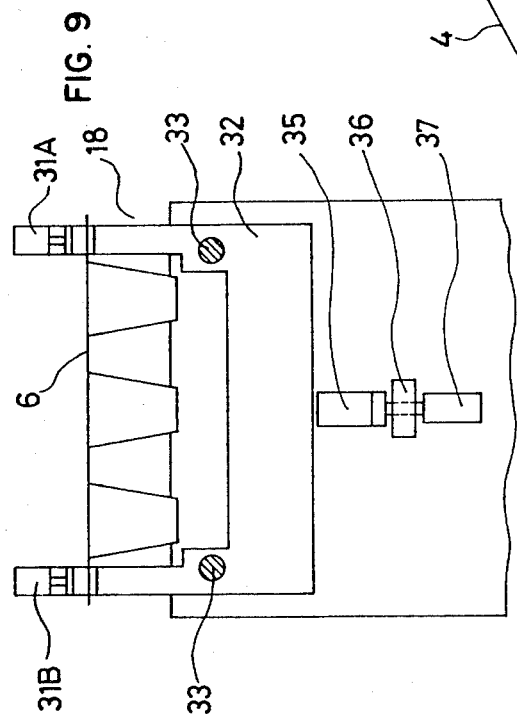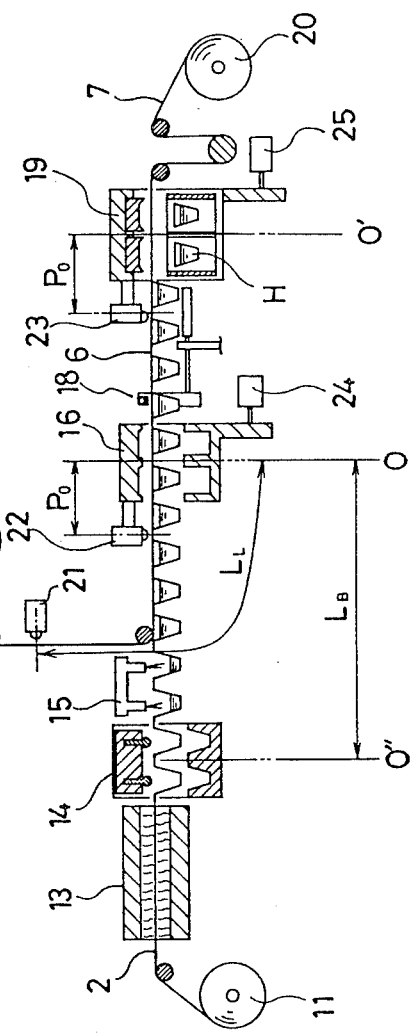

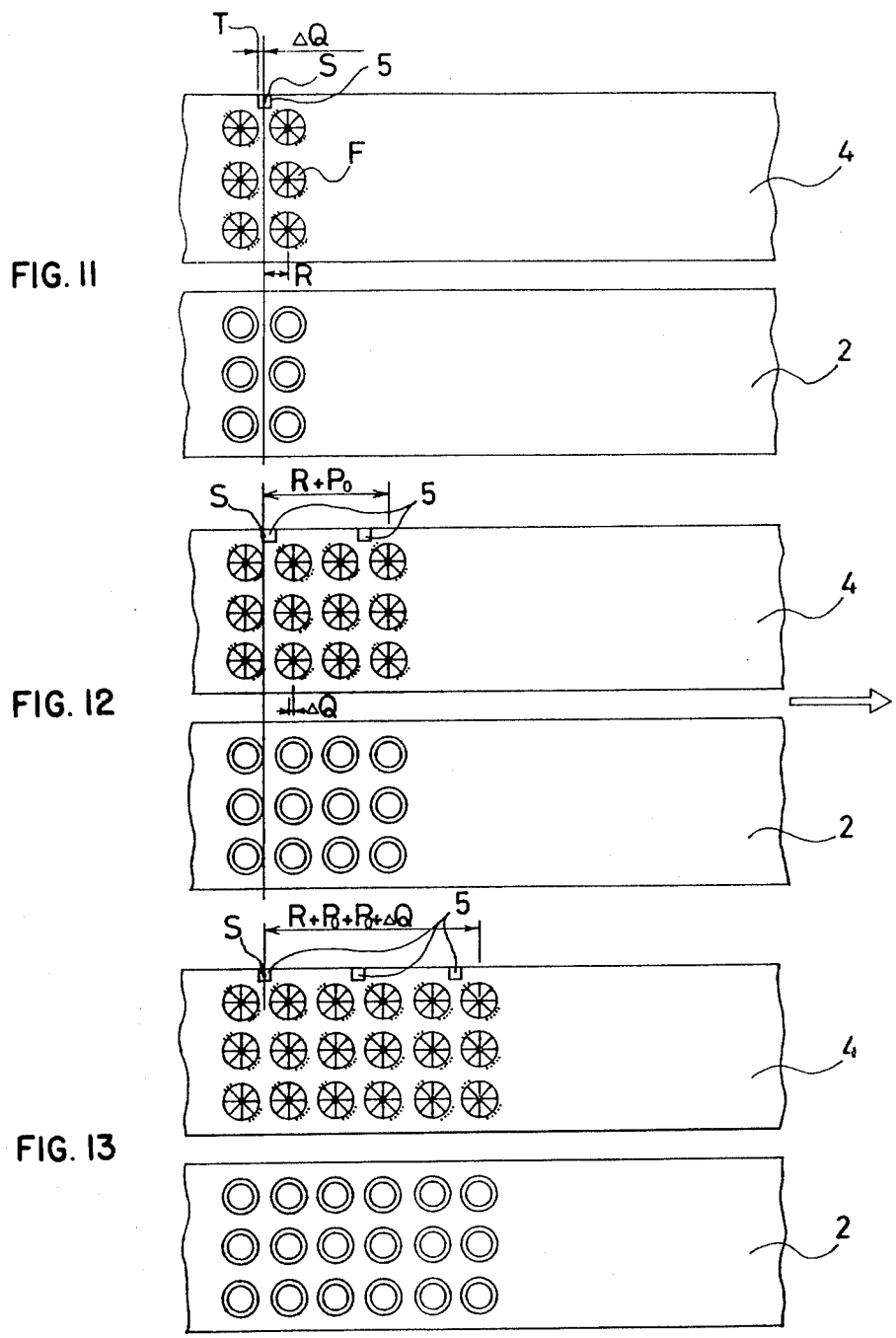

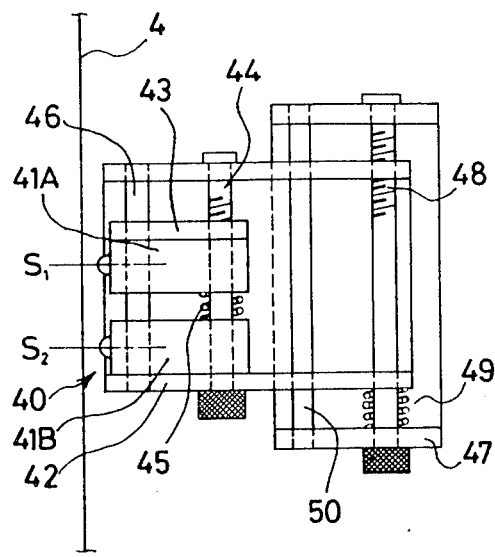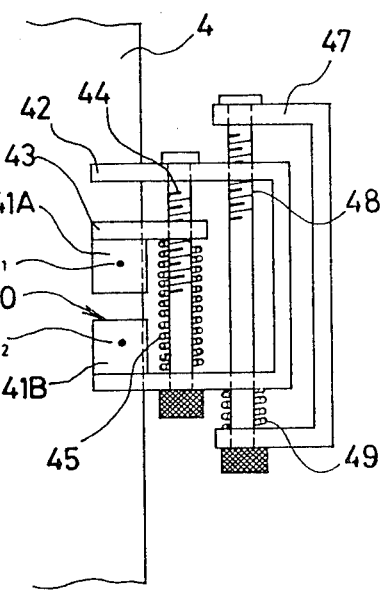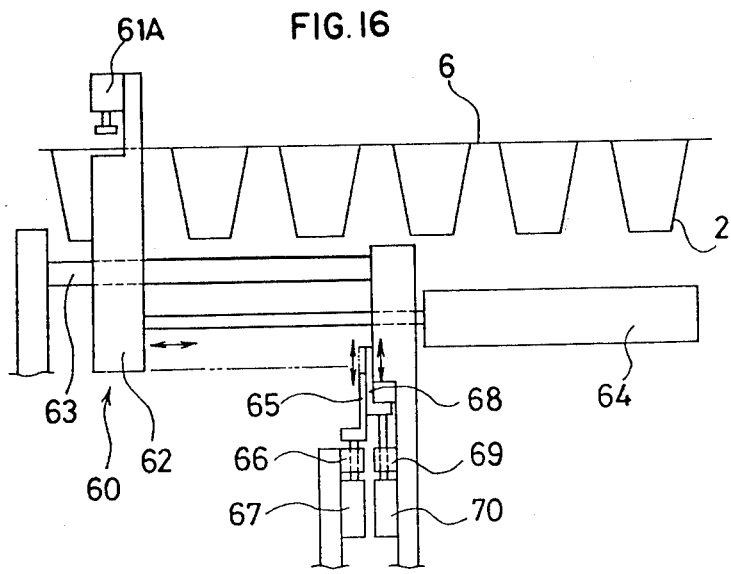

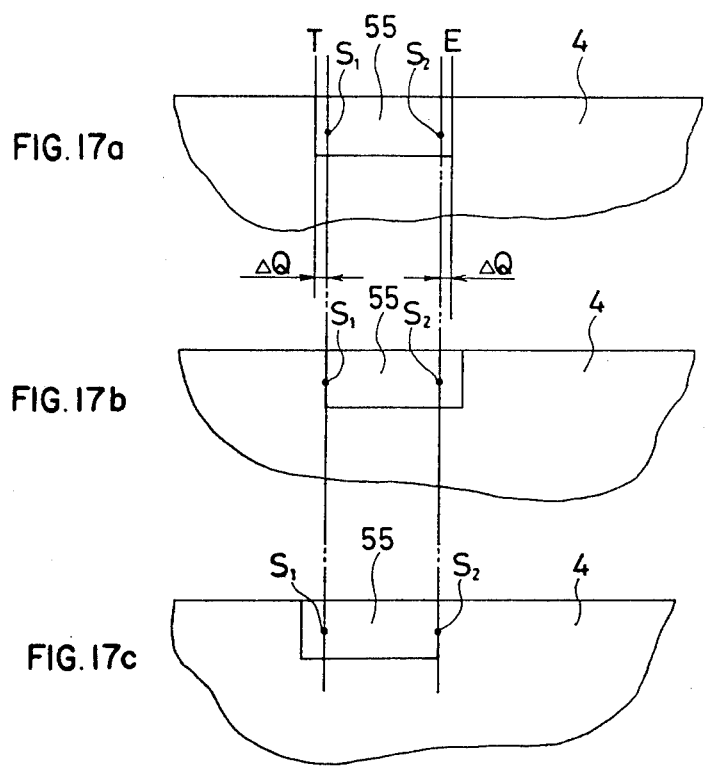
FIG.17a
FIG.17b
FIG.17c
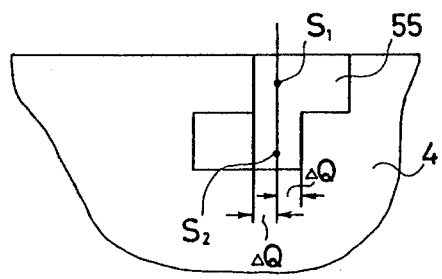
FIG.18
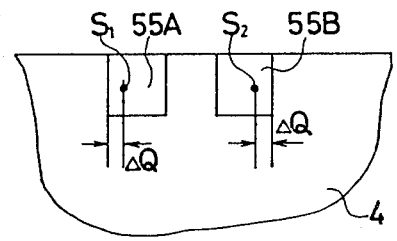
FIG.19
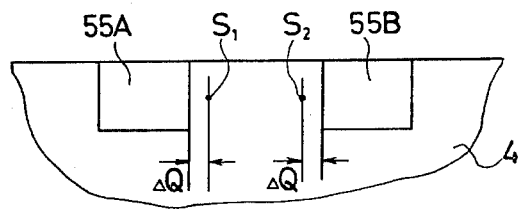
FIG.20

DEVICE FOR ENABLING REGISTRY OF OPERATIONS IN AN APPARATUS FOR CONTINUOUSLY FORMING CONTAINERS FILLED WITH MATERIAL

BACKGROUND OF THE INVENTION

The present invention relates to an improvement in a continuous forming, filling and packing apparatus.

Recently, foods such as jam, marmalade, cream and yoghurt etc. packed in small containers have become popular because of the ease of handling and in view of sanitation. For example, each food package often contains an amount of food necessary to satisfy one use or individual serving, and this will be referred hereinafter as to a "portion pack" when applicable.

FIGS. 1 and 2 illustrate conventional packages for food material and FIG. 1 is a perspective view while FIG. 2 is a cross-section taken along a line II—II in FIG. 1. A container portion 1 is made from a bottom sheet 2 of thermoplastic resin. The container portion 1 is filled with a food 3 such as jam, marmalade, cream or yoghurt. A cover portion 4 is constituted usually by a lamination of an aluminum foil and a thermally fusible resin layer. After the food 3 is placed in the container portion 1, the cover sheet 4 is placed over the opening of the container portion 1 and seals the latter by being thermally fused thereto. On an uppper surface of the cover sheet 4, a set of symbols for indicating the contents, the trade name thereof, the trademark, and the manufacturer thereof etc. (hereinafter, referred to as "symbol F" when applicable) are printed.

The usual practice is to manufacture the portion packs in a batch. For example, an array of 2×3 portion packs may be manufactured in one cycle. Therefore, the cover sheet 4 has a corresponding number of printing sets of the symbol F thereon. In FIG. 3 a reference numeral 5 indicates a reading mark which is used to control the apparatus to obtain a correspondence in postion between the symbol F on the cover sheet 4 and the container portion 1 as will be described later. The sparing or pitch of the reading marks 5 together with the symbols F may include some error which may be caused by some problem in printing preciseness. An accumulation of the errors will cause a considerable divergence between the container portion 1 and the symbol F on the cover sheet 4. Examples of such divergences are illustrated in FIGS. 4a to 4c in plan view and in FIGS. 5a to 5c in cross section, respectively. With such divergence, the portion packs are shabby and the values thereof are lowered.

In FIG. 6 a conventional apparatus for manufacturing packaged food material is shown, wherein a reference numeral 11 indicates a roll of the thermoplastic bottom sheet material 2 and 12 indicates a roll of the cover sheet material. A heating device 13 serves to heat the bottom sheet 2 and includes a pair of heat plates between which the bottom sheet 2 is passed so as to be heated to a suitable temperature.

A forming device 14 for shaping the bottom sheet 2 into containers having suitable shape after heating of the bottom sheet 2 is provided upstream of a filling device 15 serving to fill the containers 2 formed by the forming device 14 with a predetermined amount of food such as jam.

A sealing device 16 functions to seal the containers 2, each filled with a predetermined amount of food, with a laminated cover sheet 4 comprised of a lamination of aluminum foil and a thermally fusible resin layer.

The cover sheet 4 is pressed towards the open container with the resin layer side facing downwardly onto the openings of containers 2 by using a heat plate supported for vertical movement by a frame structure (not shown) to fuse the resin layer to the peripheries of the openings and then cooling the fused assembly.

A reading device 17 functions to read photoelectrically the marks 5 shown in FIG. 3 and sends an output signal to a control device (not shown).

The reading may be performed in such a way as shown in FIGS. 7a and 7b. The reading device 17 is initially set such that a center S of a light spot emitted therefrom coincides with a position prior to a trailing edge T of the mark 5 by $\Delta Q$, as shown in FIG. 7a.

When the marks 5 are printed closer together than they should be, the accumulated error after several to several tens of cycles produces a positional relation shown in FIG. 7b between the trailing edge T of the mark and the center S of the light spot from the reading device 17. By making the reading device 17 capable of discriminating the printed colour of the mark 5 from the colour of the background, the reading device 17 discriminates the condition shown in FIG. 7b and sends a signal through the control device to a carrying device 18 to correct the feeding amount of a product 6 composed of the containers sealed with the cover sheet 4 as to be described.

The carrying device 18 functions to pull intermittently the containers 2 sealed with the cover sheet 4 by the sealing device 16 in synchronism with the feeding pitch.

The conventional carrying device is shown in more detail in FIGS. 8 and 9 wherein grippers 31A and 31B associated with an air cylinder pinch the product 6 in response to a carrying signal. A slide block 32 on which the grippers 31A and 31B are mounted is guided by guide bars 33 and driven back and forth by a driving device 34 having an air cylinder. A plate 35 is provided for correcting the feeding amount of the product. The plate 35 has a thickness in the order of $\Delta Q$ and is guided by a guide 36 and driven vertically according to demand by a driving device 37 having an air cylinder.

When the positional relation between the printed mark 5 on the cover sheet 4 and the mark reading device 17 becomes as shown in FIG. 7b, the reading device 17 produces an output signal which is fed to the control device not shown. Then, the driving device 37 is actuated in response to an instruction from the control device to move the plate 35 upwardly. In this state, the grippers 31A and 31B grip the product sheet 6. By pulling the slide block 32 by the driving device 34, the amount of stroke is reduced by a distance corresponding to the thickness of the plate 35, comparing with that when the plate 35 is in the bottom position.

Therefore, it is possible to correct the carrying amount correspondingly to the accumulation of the printing errors.

In FIG. 6, a punching device 19 is shown which functions to punch the respective portion packs shown in FIG. 1 out from the product sheet 6 by using a combination of a male and female edges supported for vertical movement by the frame (not shown) of the apparatus. The products H punched out from the product sheet 6 are discharged by an ejection device (not shown) to a predetermined location.

A take-up device 20 is provided which functions to receive waste 7 after the punching performed by the punching device 19.

As described with reference to FIGS. 6 to 9, the conventional forming, filling and packing apparatus manufactures the portion packs H by performing the steps of heat-forming the container portions 2 of the thermoplastic resin, filling them with materials 3, sealing the containers with the cover sheet 4, punching the packs out from a web and then taking up the waste, together with the step of correcting the carrying amount of the sheet materials. With using this apparatus, however, the appearance of the final products are frequently degraded as shown in FIGS. 4 and 5.

That is, FIGS. 4a and 5a show an example in which the cover sheet 4 seals the container portion 2 with the symbol F printed thereon deviated from the container portion 2.

FIGS. 4b and 5b show another example in which the punching of the packs H from the web is performed erroneously causing the flange portion 8 of the pack to be unbalanced. If the punching operation is made with more deviation than that shown in FIGS. 4b and 5b, a portion of the flange in one side will be lost causing a leakage of the contents 3 of the container.

FIGS. 4c and 5c show a further example in which the flange portion is stamped by a circular male die to prevent air from being introduced in the container to thereby clearly improve preservation of the contents but the stamping is made erroneously causing a stamped recess 9 which is off-centered. If the recess is off-centered more than the above, the circular stamp may be out of the flange 8 of the container.

The reasons why these states may be caused are as follows: (1) The state shown in FIGS. 4a and 5a may be caused by an erroneous selection of the setting position of the mark reading device 17.

As shown in FIG. 6, a temporary reference position is indicated in a center X—X of the sealing portion of the sealing device 16 and the distance $L_L$ between the center S of the light spot from the reading device 17 and the center X—X is not equal to the distance $L_B$ between the center of the forming portion of the forming device 14 and the center X—X. There is, in fact, a considerable difference between $L_L$ and $L_B$. Therefore, even if the correction control of the carrying amount is performed, it only corrects the printing error of the cover sheet 4. It does not make any control so that the symbol F of the cover sheet 4 coincides with the formed container 2.

(2) The state shown in FIGS. 4b and 5b is caused by having no position correction for the punching operation by the punching device 19. Even with the carrying amount correction control, punching may be performed at an erroneous position due to the lack of the positional control of the punching.

(3) The state shown in FIGS. 4c and 5c is caused by having no position correction of the sealing operation performed by the sealing device 16.

Although the spacings of the marks printed on the cover sheet 4 usually are in error by an amount smaller than a reference spacing $P_o$, this is not always true and there may be cases where the actual spacing $P_i$ is larger than the reference spacing $P_o$. That is, the case where $P_o - P_i = \Delta P_i < 0$ can be considered. In this case $\Sigma \Delta P_i$ is negative which shows the state where the center S of the light spot is shifted from the state in FIG. 7a to the end E of the mark 5.

In this case, since the mark reading device 17 does not detect the mark 5, the carrying in the next cycle will be made by $P_o - \Delta Q$ according to the above mentioned carrying amount correction, which may cause the deviation to be more increased.

In view of the above, it may be considered to add a discriminating function to the mark reading device.

That is, it is possible to make the size of the mark 5 no larger than $2\Delta Q$ and to initially set the position of the reading member of the mark reading device at a center of the mark.

Therefore, when $|\Sigma \Delta P_i| > \Delta Q$, it becomes impossible to detect the mark by the mark reading device and thus the feeding of the cover sheet 4 is stopped.

The discriminating function is to decide whether the cover sheet should be stopped after a detection of the mark by the mark reading device or before the detection.

The former case corresponds to $\Sigma \Delta P_i > \Delta Q$ and the latter case corresponds to $\Sigma \Delta P_i < -\Delta Q$. Therefore it is enough to correct the carrying amount of the cover sheet 4 to $P_o - \Delta Q$ or $P_o + \Delta Q$ in the preceding cycle.

The case where the carrying amount is to be increased may be handled in the same manner as shown in FIGS. 8 and 9.

However, the addition of the discriminating function to the mark reading device may considerably increase the cost.

In the apparatus shown in FIG. 6, when the sealing device 16 and the punching device 19 are not in appropriate positions, respectively, even if the symbols on the cover sheet 4 correspond exactly in position to the container portions 2, the appearance of the product H will be degraded. Therefore, it is necessary to provide other mark reading devices for the sealing device 16 and the punching device 19, respectively, so that the sealing device 16 and the punching device 19 can be moved in response to output instructions produced by these additional reading devices, respectively. This may cause the same disadvantages as those encountered previously.

SUMMARY OF THE INVENTION

A primary object of the present invention is to eliminate the disadvantages inherent to the conventional technique and to provide a forming, filling and packing apparatus by which the registration of the containers formed in the bottom sheet with the symbols printed on the cover sheet can be easily achieved and the sealing can be made optimum and the punching of the product from a web can be made at the optimum position.

Another object of the present invention is to provide a forming, filling and packing apparatus equipped with a mark reading device capable of reading a deviation from the marks printed on the cover sheet and of correcting the carrying amount thereof according to the deviation.

The present invention resides in a forming, filling and packing apparatus having a heating device for heating a bottom sheet of thermoplastic resin supplied intermittently thereto, a forming device for forming container portions from the heated bottom sheet while keeping the latter continuous, a filling device for filling the container portions with material, a sealing device for sealingly covering the container portions with a cover sheet carried in synchronism with the intermittent supply by adhering the cover sheet to the bottom sheet formed with the containers, the cover sheet bearing pitch marks corresponding to the intermittent movement and symbol marks printed thereon, a punching device for removing the sealingly covered containers from the continuous web of the bottom sheet laminated with the cover sheet, and a carrying device for feeding intermittently the bottom sheet and the cover sheet, characterized by a mark reading device disposed at a position separated from the sealing device by a distance equal to a distance between the forming device and the sealing device.

Further, the present invention resides in a forming, filling and packing apparatus having a heating device for heating a bottom sheet of thermoplastic resin supplied intermittently thereto, a forming device for forming container portions from the heated bottom sheet while keeping the latter continuous, a filling device for filling the container portions with material, a sealing device for sealingly covering the container portions with a cover sheet carried in synchronism with the intermittent supply by adhering the cover sheet to the bottom sheet formed with the container portions, the cover sheet bearing pitch marks corresponding to the intermittent movement and symbol marks printed thereon, a punching device for removing the sealingly covered containers from the continuous web of the bottom sheet laminated with the cover sheet, and a carrying device for feeding intermittently the bottom sheet and the cover sheet, characterized by further comprising a back and forth device for moving back and forth at least either of the sealing device and the punching device in the feeding direction of the bottom sheet, and a mark reading device disposed at a position separated from the sealing device by a distance equal to a distance between the forming device and the sealing device.

Furthermore, the present invention resides in a forming, filling and packing apparatus having a heating device for heating a bottom sheet of thermoplastic resin supplied intermittently thereto, a forming device for forming container portions from the heated bottom sheet while keeping the latter continuous, a filling device for filling the container portions with material, a sealing device for sealingly covering the container portion with a cover sheet carried in synchronism with the intermittent supply by adhering the cover sheet to the bottom sheet formed with the container portions, the cover sheet bearing pitch marks corresponding to the intermittent movement and symbol marks printed thereon, a punching device for removing the sealingly covered containers from the continuous web of the bottom sheet laminated with the cover sheet, and a carrying device for feeding intermittently the bottom sheet and the cover sheet, characterized by further comprising a mark reading device having a pair of mark readers which reads the marks within one pitch of the cover sheet.

The above objects and features as well as other objects and features of the present invention will become more clear by the following description of the preferred embodiments with reference to the attached drawings.

BRIEF DESCRIPTION OF THE DRAWING

FIGS. 4a to 4c are plane views of the portion packs, respectively;
FIGS. 5a to 5c are cross-sectional views taken along lines IV—IV in FIGS. 4a to 4c, respectively;
FIG. 6 is a view for explaining schematically the conventional forming, filling and packing apparatus;
FIGS. 7a and 7b are views for explaining the reading of the reading marks;
FIG. 8 is a side view of the conventional carrying device;
FIG. 9 is a cross section taken along a line III-V—IIIV in FIG. 8;
FIG. 10 shows schematically a forming, filling and packing apparatus according to the present invention;
FIGS. 11 to 13 are views for explaining the relation between the cover sheet and the bottom sheet;
FIG. 14 is a front view of the mark reading device according to another embodiment of the present invention;
FIG. 15 is a side view of the reading device in FIG. 14;
FIG. 16 is an enlarged view of a carrying device corresponding to that in FIG. 8;
FIGS. 17a to 17c are explanatory drawings for the operation of the mark reading device;
and
FIGS. 18 to 20 show relations between the reading marks and the mark reading device according to another embodiment of the present invention.

DETAILED DESCRIPTION OF THE EMBODIMENTS

Figure 1:
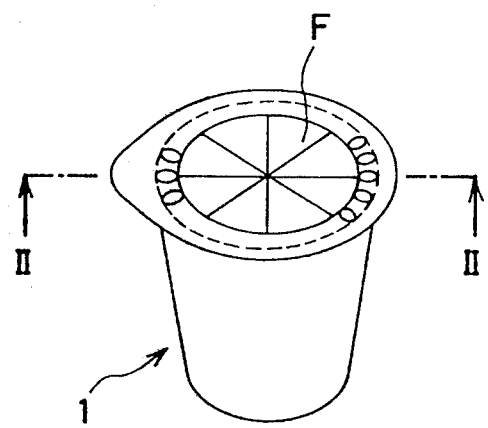
FIG. 1 is a perspective view of a portion pack.
Figure 2:
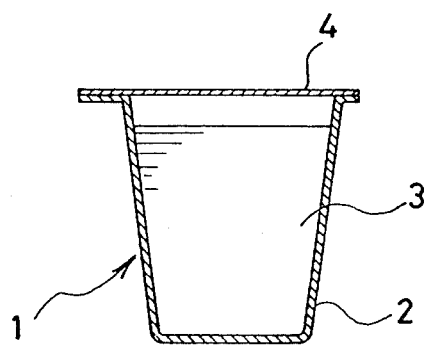
FIG. 2 is a cross-section taken along a line II—II in FIG. 1.
Figure 3:
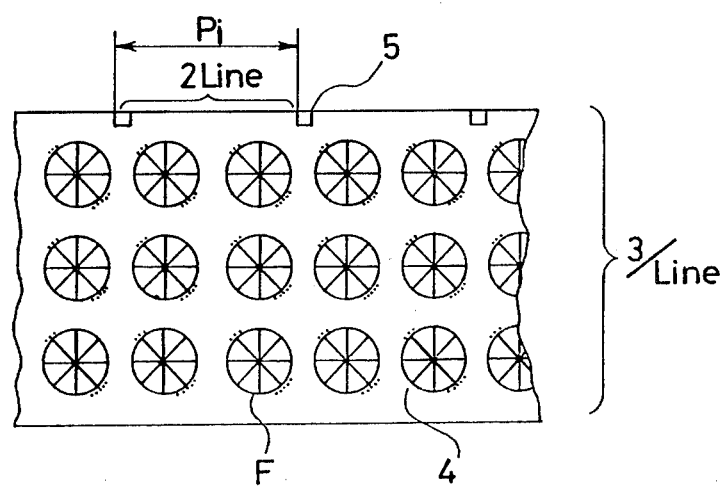
FIG. 3 is a plane view of the cover sheet.

The present invention will now be described with reference to the embodiments shown in FIGS. 9 to 13.

Since the forming, filling and packing apparatus shown in these figures is similar to the conventional apparatus shown in FIG. 6, explanations of the devices depicted by the same reference numerals will be omitted.

This apparatus can produce 2×3 products H in one cycle of operation, in which a cover sheet 4 is fed such that each of the reading marks 5 printed thereon is at a position intermediate one cycle of operation of the apparatus.

Reference numerals 21 to 23 show reading devices for reading the marks 5, and centers of the sealing device 16, the punching device 19 and the forming device 14 are depicted as O, O' and O'', respectively. When a distance between the centers O and O'' is represented by $L_B$, the reading device 21 is disposed in a position in the upstream side separated from the center O by $L_L$, wherein $L_L = L_B$.

The reading devices 22 and 23 are provided integrally with the sealing device 16 and the punching device 19, respectively, to detect positions separated from the centers O and O' by a distance $P_o$, respectively.

The sealing device 16 and the punching device 19 are supported by a frame structure (not shown) moveable in the feeding or carrying direction of the bottom sheet 2 and the cover sheet 4. The movements of the devices 16 and 19 are effected independently by back and forth devices 24 and 25, respectively.

A carrying amount correction control will be described with reference to FIGS. 11 to 13 in which the positional relation between the reading of the mark 5 indicating the symbols F on the cover sheet 4 by the reading device 21 and the forming of the container portions 2 from the heated bottom sheet by the forming device 14 is shown through three operation cycles. S indicates the center of the light spot from the reading device 21 and T indicates the trailing end of the mark 5.

In FIG. 11, it is assumed that the reading of the mark 5 for the cover sheet 4 is in the same state as that shown in FIG. 7a. The forming of the containers 2 is performed at positions corresponding to the symbols F on the cover sheet 4. Further, a distance between the center of the right hand symbol F in FIG. 11 and the center S of the light spot is assumed as R.

Under these conditions, there is no need of correction of the carrying amount of the cover sheet. Therefore, the cover sheet 4 and the bottom sheet 2 are carried away to the next cycle with the reference pitch $P_o$. Assuming that the pitch between the symbol F on the cover sheet 4 in FIG. 11 and that in the next cycle becomes $P_o - \Delta Q$ due to a printing error, the condition of the sheet 4 after one cycle with the reference pitch $P_o$ becomes as shown in FIG. 12 and the reading of the mark becomes the same as shown in FIG. 7b. Since the feeding or carrying amounts of the sheets 2 and 4 are the same, the forming of the container portions in this state is performed at positions substantially corresponding to the symbols F on the cover sheet 4 with a light deviation within the range of the order of $\Delta Q$ from the symbol F (this order may not substantially affect the appearance of the product).

When the reading of the mark on the cover sheet 4 becomes as shown in FIG. 12, there is the correction of feeding amount required. Therefore, the carrying device 18 is controlled by an instruction from the control device (not shown) such that the cover sheet 4 and the bottom sheet 2 are fed in the next cycle with the pitch $P_o - \Delta Q$ (here, the correction amount is assumed as $\Delta Q$). As a result, it becomes as shown in FIG. 13. In FIG. 13, since the feeding amounts of the sheets 2 and 4 are the same, the forming of the bottom sheet 2 can be performed at positions substantially corresponding to the symbols F on the cover sheet 4 as in the case shown in FIG. 12.

In this manner, the sheets 2 and 4 are fed sequentially with the symbol F on the cover sheet 4 being coincident to the containers 2, respectively, and these sheets are sealed together. That is, the containers are formed from the bottom sheet 2 with the pitch $P_o$ or $P_o - \Delta Q$ in response to the instruction from the reading device 21 and thus the symbol F on the cover sheet 4 substantially coincides with the container (within the range of $\Delta Q$).

In the embodiment in FIG. 10, the distance $L_B$ (this is equal to the distance $L_L$ between the center O and the reading device 21) between the center O" of the forming device 14 and the center O of the sealing device 16 is made as 4 $P_o$.

In a case where the carrying device 18 feeds the bottom sheet 2 and the cover sheet 4 with the pitch $P_o - \Delta Q$ according to the instruction from the reading device 21, the reading device 22 does not detect the mark 5 and, therefore, the feeding of the sheets 2 and 4 is stopped according to an instruction. In this case, the back and forth device 24 is actuated by the control device (not shown) to retrieve the sealing device 16 by $\Delta Q$ in the next cycle. That is, as shown in FIG. 10, at the distance between the centers O and O" or the distance between the center O and the reading device 21, i.e., $L_B = 4P_o - \Delta Q$, the sealing device 16 is actuated.

If the subsequent feeding is made with the pitch $P_o$, the reading device 22 will change the state from detection of the mark 5 to non-detection of the mark 5 in the fourth cycle. At this time, the feeding is stopped by an instruction. Then, in the next cycle, the back and forth device 24 is actuated by the control device (not shown) to advance the sealing device 16 by $\Delta Q$.

The above operation is the same for the punching device 19 and, so, any details thereof will be unnecessary.

Therefore, only one deviation of $\Delta Q$ which is within the tolerance occurs with respect to the feeding of the bottom sheet 2 with $P_o - \Delta Q$ by the carrying device 18 for the sealing and punching.

In the forming, filling and packing apparatus according to this embodiment, the mark reading device 21 is disposed at the position on the cover sheet 4 remote from the center O of the sealing device 16 by a distance equal to the distance $L_B$ between the center O" of the forming device 14 and the center O. Therefore, there is substantially no deviation between the container and the symbol F on the cover sheet 4 resulting in a good appearance of the product H.

Further, since the sealing device 16 and the punching device 19 are made movable by the provisions of the back and forth devices 24 and 25, respectively, and the reading devices 22 and 23 are provided in the upstream sides of the sealing device 16 and the punching device 19 in positions remote from the latter by the reference pitch $P_o$, respectively, the sealing and punching correspond well to the container formed in the bottom sheet 2 resulting in good appearance of the products.

Although, in the above embodiment, the reading devices 22 and 23 are integrally provided on the sealing device 16 and the punching device 19, respectively, they may be provided in the following manner.

When the carrying device 18 feeds the sheets 2 and 4 by $P_o - \Delta Q$ according to an instruction of the reading device 21, the back and forth devices 24 and 25 are actuated to retrieve the sealing device 16 and the punching device 19 by $\Delta Q$ simultaneously.

On the other hand, since the number of pitches between reference marks 5 between the sealing device 16 and the punching device 19 with respect to the forming device 14 is fixed as, for example, four and 7 in FIG. 10, it may be possible to memorize by a memory (not shown) the time when the carrying device 18 feeds with the pitch $P_o - \Delta Q$ and advance the sealing device 16 and the punching device 19 by $\Delta Q$ by means of the back and forth devices 24 and 25 in the fifth and eighth cycles, respectively.

By doing so, there is no deviation occurs in sealing and punching the containers and the cover sheet 4.

When the pitch $P_f$ of the reading mark 5 is larger than $P_o$, it is necessary to make the feeding amount of the laminated sheet 6 layer than $P_o$. This may be sufficient to do in simple reverse manner and so, details thereof will be omitted.

FIGS. 14 to 17 show another embodiment of the present invention and FIGS. 14 and 15 are enlarged views of an example of a mark reading device 40 corresponding to the conventional reading device 17 in FIG. 6. 41A and 41B are a pair of mark readers and $S_1$ and $S_2$ are the centers of the light spots from the mark readers 41A and 41B.

42 and 43 are brackets for mounting the readers 41A and 41B, respectively, and the bracket 42 has a U shape.

The bracket 43 is formed with a threaded hole for receiving a regulation screw 44 and a gride hole for a gride 46 so that, by turning the screw 44 supported by opposite ends of the U shaped bracket 42, it is guided by the gride 46 vertically.

The regulation screw 44 has a fine pitch so that the relative position of the reader 41A to that of the reader 41B can be finely regulated.

45 is a spring for preventing the reader 41A from shifting due to an unbalance of the bracket 43 and the regulation screw 44. The spring 45 always urges the bracket 43 upwardly with respect to the bracket 42.

47 is a bracket having U shape which is secured to the frame structure (not shown). The bracket 42 is formed with a threaded hole for receiving a regulation screw 48 and a gride hole for a gride 50 so that, by turning the regulation screw 48 supported by opposite ends of the U shaped bracket 47, it is guided vertically along the gride 50. The screw 48 has a pitch as fine as that of the regulation screw 44. A spring 49 has the same function as the spring 45.

An example of a carrying device 60 for correcting the amount of feeding of the laminated sheet 6 (the cover sheet 4 and the bottom sheet 2) according to information read by a mark reading device 40 will be described with reference to FIG. 16.

FIG. 16 corresponds to FIG. 8 used to explain the conventional device.

61A is a gripper, 62 is a slide block, 63 is a guide bar and 64 is a driving device.

65 is a plate whose thickness is $\Delta Q$, 66 is a guide for the plate 65, and 67 is a driving device for correcting the feeding amount from the reference pitch $P_o$ to $P_o - \Delta Q$. 68 is a second plate whose thickness is $\Delta Q$, 69 is a guide for the second plate 68 and 70 is a driving device for correcting the feeding amount from the reference pitch $P_o + \Delta Q$.

When the feeding of the laminated sheet 6 is made with the reference pitch, the driving device 70 is actuated under a control such that the slide block 62 engages with the plate 68. When the feeding is to be corrected so as to feed with $P_o + \Delta Q$, the driving device 70 is actuated under a control such that the slide block 62 is disengaged from the plate 68.

When the feeding is to be corrected so as to feed with $P_o - \Delta Q$, the driving devices 70 and 67 are actuated under a control such that the slide block 62 engages through the plate 68 with the plate 65.

When the cover sheet 4 and the bottom sheet 2 are fed with the reference pitch $P_o$ by the carrying device 60, it is assumed that it is adjusted such that the containers formed in the bottom sheet 2 and the symbols on the cover sheet 2 are well matched. In this case, the regulation screws 44 and 48 are operated to move the readers 41A and 41B so that the spot ends $S_1$ and $S_2$ of the readers 41A and 41B of the mark reading device 40 are set in positions shifted by $\Delta Q$ inside from the trailing end T of the mark 55 printed on the sheet 4 and by $\Delta Q$ inside from the leading end E thereof, respectively, as shown in FIG. 17a.

It is assumed that the pitch of the mark 55 is $P_i(i=1, 2, \ldots)$ and $P_o - P_i = \Delta P_i$. Further, it is assumed that the reference pitch of the cover sheet 4 and bottom sheet 2 in the carrying device 60 is $P_o$ and it becomes $\Sigma \Delta P_i = \Delta Q$ after several cycles.

That is, in the state where the cover sheet 4 is stopped, the relation of the spot ends $S_1$ and $S_2$ of the readers 41A and 41B and the mark 55 becomes as shown in FIG. 17b. In this case, the reader 41B detects the mark 55 while the reader 41A does not.

With this stuation, the driving device 67 of the carrying device 60 is actuated by a control device (not shown) to move the plate 65 upwardly.

Therefore, in the next cycle, the feeding amount of the cover sheet 4 and the bottom sheet 2 in the carrying device 60 becomes $P_o - \Delta Q$ and it returns to the state shown in FIG. 17a. Simultaneously, the plate 65 is lowered by the driving device 67 so that it returns to the original pitch $P_o$ in the next cycle.

When $\Sigma \Delta P_i = -\Delta Q$, i.e., it becomes the state shown in FIG. 17c, the mark reader 41A detects the mark 55 while the reader 41B does not. At that time, the driving device 70 is actuated by a control device to lower the plate 68.

Therefore, the feeding amount in the next cycle becomes $P_o + \Delta Q$ and returns to the state shown in FIG. 17a.

In this manner, in this embodiment of the present invention, since the marks 55 printed on the cover sheet 4 with a predetermined pitch are read by the mark reading device 40 composed of the pair of the mark readers 41A and 41B disposed along the moving line of the cover sheet 4, the marks 55 can be detected without adding special discriminating functions to the apparatus as in the conventional apparatus. Further, these marks 55 can be detected not only when an accumulation $\Sigma \Delta P_i$ of errors $\Delta P_i$ relative to the reference pitch $P_o$ of the mark 55 is large than the tolerable deviation $\Delta Q$, but also when it is smaller than $-\Delta Q$.

Further since the mark readers 41A and 41B of the reading device 40 can be shifted by the regulation screws 44 and 48, it becomes possible to regulate the relative distance between the readers 41A and 41B and the relative position between the marks 55 on the cover sheet 4 and the reading device 40, resulting in a precise positional regulation of the symbols printed on the cover sheet 4 with respect to the containers.

In the above embodiment, the readers 41A and 41B of the reading device 40 are moved along the flow line of the cover sheet 4. It should be noted, however, that they can be arranged in parallel with each other and there is no need for printing the marks 55 continuously.

Further, in this embodiment, the deviation is recognized when the readers 41A and 41B of the reading device 40 do not detect the marks 55. Alternatively, it is also possible to recognize the deviation when the readers detect them.

FIGS. 18 to 20 show the relation when the spot centers of the readers 41A and 41B are $S_1$ and $S_2$, the marks are 55 or 55A and 55B.

The effects obtainable from these embodiments are similar to those obtained in the preceding embodiments.

Furthermore, in order to reduce the deviation between the symbols on the cover sheet 4 and the containers formed in the bottom sheet 2, which is caused by an accumulation of errors of the pitch of the symbols (including the marks 55) printed on the cover sheet 4 with respect to the reference pitch $P_o$ thereof, as small as possible, the marks 55 are read by the reading device 40 to correct the feeding amount by the carrying device 60. This may also be used when the sealing and/or punching position is to be corrected.

That is, by providing reading devices 40 each composed of the readers 41A and 41B on the sealing device 16 and/or the punching device 19 and making the latter two movable along the feeding line by using suitable driving devices, the sealing device 16 and/or the punching device 19 are moved according to the instruction from the reading devices 40. With this arrangement, the same effects as those obtained in relation to the correction of the carrying device 60.

In this case, it becomes possible to seal and punch the products having the symbols and the containers mated positionally at optimum positions, resulting in the packed products H having good appearance.

What is claimed is:

1. In a forming, filling and packing apparatus including a heating means for heating a bottom sheet of thermoplastic material fed intermittently, a forming means for forming successive container portions in said heated bottom sheet, a filling means for filling said container portions with material to be packed, a sealing means for sealing said container portions with a cover sheet having formed thereon reading marks and symbols corresponding to said container portions and fed intermittently together with said bottom sheet, said marks being formed with a spacing corresponding to the amount of intermittent movement of said bottom sheet and said cover sheet, and a carrying means for feeding intermittently said bottom sheet and said cover sheet, the improvement comprising reading means disposed in a position remote from said sealing means by a distance equal to the distance between said forming means and said sealing means for reading said marks.

2. In a forming, filling and packing apparatus including a heating means for heating a bottom sheet of thermoplastic material fed intermittently, a forming means for forming successive container portions in said heated bottom sheet, a filling means for filling said container portions with material to be packed, a sealing means for sealing said container portions with a cover sheet having formed thereon reading marks and symbols corresponding to said container portions and fed intermittently together with said bottom sheet, said marks being formed with a spacing responding to the amount of intermittent movement of said bottom sheet and said cover sheet, a punching means for punching out products produced by said sealing means in succession, and a carrying means for feeding intermittently said bottom sheet and said cover sheet, the improvement comprising means provided on at least one of said sealing means and said punching means for moving it along the direction of movement of said bottom sheet, and reading means disposed in a position remote from said sealing means by a distance equal to a distance between said forming means and said sealing means for reading said marks.

3. In a forming, filling and packing apparatus including a heating means for heating a bottom sheet of thermoplastic material fed intermittently, a forming means for forming successive container portions in said heated bottom sheet, a filling means for filling said container portions with material to be packed, a sealing means for sealing said container portion with a cover sheet having formed thereon reading marks and symbols corresponding to said container portions and fed intermittently together with said bottom sheet, said marks being formed with a spacing corresponding to the amount of intermittent movement of said bottom sheet and said cover sheet, and a carrying means for feeding intermittently said bottom sheet and said cover sheet, the improvement comprising reading means for reading said marks on said said cover sheet, said reading means including a pair of mark readers spaced in the direction of movement of said cover sheet and said bottom sheet by a distance less than that between two successive ones of said marks.

4. In a forming, filling and packing apparatus as claimed in claim 3, the improvement further comprising a first bracket means provided on said reading means for supporting one of said mark readers, second bracket means for supporting the other of said mark readers, said second bracket being supported for movement by said first bracket so that the relative distance between said mark readers can be adjusted.

* * * * *